United States Patent [19]

Surauer et al.

[11] Patent Number: 5,433,402
[45] Date of Patent: Jul. 18, 1995

[54] ATTITUDE CONTROL PROCESS AND DEVICE FOR A SPACECRAFT TO BE ROTATED AROUND AN AXIS OF A BODY

[75] Inventors: Michael Surauer, Chieming; Helmut Bittner, Munich, both of Germany

[73] Assignee: Deutsche Aerospace AG, Munich, Germany

[21] Appl. No.: 199,330
[22] PCT Filed: Sep. 4, 1992
[86] PCT No.: PCT/EP92/02049
§ 371 Date: Jun. 23, 1994
§ 102(e) Date: Jun. 23, 1994
[87] PCT Pub. No.: WO93/04921
PCT Pub. Date: Mar. 18, 1993

[30] Foreign Application Priority Data

Sep. 6, 1991 [DE] Germany ............... 41 29 627.3

[51] Int. Cl.⁶ .................................. B64G 1/26
[52] U.S. Cl. ........................... 244/164; 244/169; 364/434; 364/459
[58] Field of Search ............... 244/176, 164, 165, 169, 244/170, 171; 364/437, 434, 499; 318/581, 584, 585, 586, 629

[56] References Cited

U.S. PATENT DOCUMENTS

| | | | |
|---|---|---|---|
| 3,961,234 | 6/1976 | Chambers et al. | 318/624 |
| 4,424,948 | 1/1984 | Muhlfelda et al. | 244/170 |
| 4,504,232 | 3/1985 | Phillips et al. | 244/170 |
| 4,567,564 | 1/1986 | Bittner et al. | 244/164 |
| 4,725,024 | 2/1988 | Vorlicek | |
| 4,914,564 | 4/1990 | Surauer et al. | 264/153 |
| 5,042,752 | 8/1991 | Surauer et al. | 244/169 |
| 5,310,143 | 5/1994 | Yocum et al. | 244/169 |

Primary Examiner—Galen L. Barefoot
Attorney, Agent, or Firm—Evenson, McKeown, Edwards & Lenahan

[57] ABSTRACT

This device is used for controlling the attitude of a spacecraft to be rotated about a body's axis of rotation. Actuators generate torques about the axis of rotation and two lateral axes. Angular velocity signals $\omega_X$, $\omega_Y$ with respect to the lateral axes are in each case fed to first and second signal paths. The latter contain an integrator. Modulators, which each comprise a variable dead zone, supply control signals for the actuators. In order to limit the nutation amplitude to a constant value in a reliable manner, multiplication elements are provided in the first and second signal paths. The lateral-axis angular velocity signals $\omega_X$, $\omega_Y$ or the angular position signals $\Phi$, $\theta$ are acted upon by factors which are proportional to the rotation axis angular velocity signal $\omega_Z$ or its square in the multiplication elements. Furthermore, the thresholds of the dead zones of the modulators are varied proportionally to $\omega_Z^2$. A corresponding process for the attitude control is also described.

15 Claims, 4 Drawing Sheets

ATTITUDE CONTROL PROCESS AND DEVICE FOR A SPACECRAFT TO BE ROTATED AROUND AN AXIS OF A BODY

BACKGROUND AND SUMMARY OF THE INVENTION

The invention relates to a device and process for controlling the attitude of a spacecraft to be rotated about an axis of its body, i.e., the axis of rotation, and more particularly to an attitude control device comprising actuators for generating torques about the axis of rotation as well as about two lateral axes which are orthogonal with respect to the axis of rotation and to one another. Sensors are provided for the formation of angular velocity signals with respect to the three axes. Two modulators, which are in each case connected in front of the actuators assigned to one of the two lateral axes emit controlling signals to the actuators and have a variable dead zone. Two regulator networks, which receive one of the two lateral-axis angular velocity signals respectively, furnish a control signal for one of the two modulators and have a first signal path as well as a second signal path which is connected in parallel to the first one and contains an integrator.

This type of a device and this type of a process are known from U.S. Pat. No. 4,725,024. The object of U.S. Pat. No. 4,725,024 is to send a three-axis stabilized satellite, which is on a low, almost circular orbit, into an elliptic transfer path by igniting a perigee power unit. The apogee of this transfer path coincides with the radius of the endeavored geostationary orbit. Before igniting the perigee engine, for reasons of stability, the satellite must be rotated about a body axis of rotation which is to coincide with the thrust vector of the thrust exercised by the perigee power unit. In this case, the perigee power unit is still docked to the satellite, and the axis of symmetry of the power unit is congruent with an axis of symmetry of the satellite. In the case of U.S. Pat. No. 4,725,024, this is the roll axis. As known, the roll axis is one of the body's three axes of the satellite forming a rectangular system of coordinates, which also include the yaw axis as well as the pitch axis as the lateral axes. In the final operating condition of the satellite on the geostationary orbit, the roll axis must be oriented in the flight direction; the yaw axis must be oriented toward the center of the earth; and the pitch axis must be oriented perpendicularly to the two as well as to the plane of the orbit.

The attitude control system of a three-axis stabilized satellite includes a number of actuators, for example, fuel nozzles, which are capable of furnishing in a targeted manner torques or controlling torques about the three above-mentioned axes. The known attitude control device according to U.S. Pat. No. 4,725,024 also has sensors in the form of gyroscopes which furnish angular velocity signals with respect to rotations about the three axes of the body. Each of the two lateral-axis angular velocity signals is fed into a regular network which furnishes a control signal for a modulator which comprises a dead zone and, in turn, has the task of generating discrete control signals for the actuators assigned to the respective lateral axis. The two regulator networks have a first signal path as well as a second signal path which is connected in parallel to the first and contains an integrator. The two signal paths are fed together in front of the assigned modulator in a summation element.

Before being discharged from the space tug, the satellite with the docked perigee power unit already rotates slowly at approximately two revolutions per minute about the axis of rotation. After the discharge of the thus formed spacecraft from the loading bay of the space tug, via the actuating of the corresponding actuators, the rotation about the axis is continuously increased to a value of approximately forty revolutions per minute. If possible, care must be taken during this spin-up phase that the inevitably occurring nutation is controlled to a constant amplitude and the direction of the axis of rotation in the inertial space is maintained as precisely as possible.

The excitation of nutation vibrations may have different causes. Thus, generally, because the mass distribution is not completely symmetrical, the main inertia axis of the satellite/perigee power unit combination will not coincide with the original axis of rotation. The rotation is to be stabilized about this main inertia axis which represents the axis with the smallest moment of inertia. However, the actuators causing the rotation are arranged symmetrically with respect to the geometric axis of rotation so that lateral-axis torques already occur here. Even higher lateral-axis torques are caused by the fact that the center of gravity of the satellite/perigee power unit combination shifts considerably with respect to the center of gravity of the satellite. The actuators serving the attitude control, in their arrangement on the satellite as well as with respect to the direction of action of their controlling torques, are adapted to a constellation in the case of which the satellite has already separated from the perigee power unit. Since however, the rotation caused during the spin-up phase as well as the then required attitude control are to be carried out exclusively via the actuators which anyhow exist in the normal operation, the shifting of the center of gravity when an actuator is operated causes considerable environmental torques about other axes. In addition, an increase in amplitude of the nutation may be caused by a sloshing of liquid fuel.

In the case of the attitude control device according to U.S. Pat. No. 4,725,024, it is provided that, after approximately half the spin-up operation, the dead zones of the modulators must suddenly be expanded. This has the purpose of permitting larger nutation amplitudes without any intervention of the power units. However, since the destabilizing influences increase with the nutation amplitude, a control of the nutation to a constant amplitude would be extremely expedient. However, by means of the known attitude control device, this object cannot be achieved, particularly since the regulator networks operate in the two signal paths with a respective constant amplification.

It is a further disadvantage of the known attitude control device that the gyroscope used for measuring the angular velocity about the axis of rotation will be saturated after a short period of time because it is designed only for relatively low angular velocities occurring during normal operation. As a result, the angular position information for all three axes is lost shortly after the start of the spin-up phase, as well as the angular velocity information for the axis of rotation. There is the danger of an undesirable drifting-away of the axis of rotation from the inertial orientation that is to be maintained, if possible. Finally, the lateral-axis angular velocity signals contain constant signal fractions which result in an asymmetrical controlling-out of the dead zones of the modulators and, thus, to the triggering of one-sided control interventions as well as to the adjustment of the axis of rotation. The constant signal fractions are caused by the fact that, as mentioned above, the spacecraft rotates about the main axis of inertia which has unavoidable deviations from the geometric axis. The gyroscopes, serving for measuring the angular velocities, are aligned to the geometric satellite axes so that the angular velocity signals contain fractions which are proportional to the variation of the compass between the geometric and the main inertia axis and the angular velocity about the axis of rotation.

The invention is therefore based on the object of providing a device of the above-mentioned type which mainly permits the limiting of the nutation amplitude to a constanct value in a reliable manner. According to the invention, this object is achieved by an attitude control device comprising actuators for generating torques about the axis of rotation as well as about two lateral axes which are orthogonal with respect to the axis of rotation and to one another. Sensors are provided for the formation of angular velocity signals with respect to the three axes. Two modulators, which are in each case connected in front of the actuators assigned to one of the two lateral axes emit controlling signals to the actuators and have a variable dead zone. Two regulator networks, which receive one of the two lateral-axis angular velocity signals respectively, furnish a control signal for one of the two modulators and have a first signal path as well as a second signal path which is connected in parallel to the first one and contains an integrator. Two first multiplication elements are each connected into one of the two first signal paths and use factors which are dimensioned proportionally to the rotation axis angular velocity signal. Two second multiplication elements are each connected into one of the two second signal paths behind the integrator and use factors which are dimensioned proportionally to the square of the rotation axis angular velocity signal. Devices are provided for varying the thresholds of the dead zone of the respective modulator proportionally to the square of the rotation axis angular velocity signal.

Other objects, advantages and novel features of the present invention will become apparent from the following detailed description of the invention when considered in conjunction with the accompanying drawings.

DETAILED DESCRIPTION OF THE DRAWINGS

Figure 1:
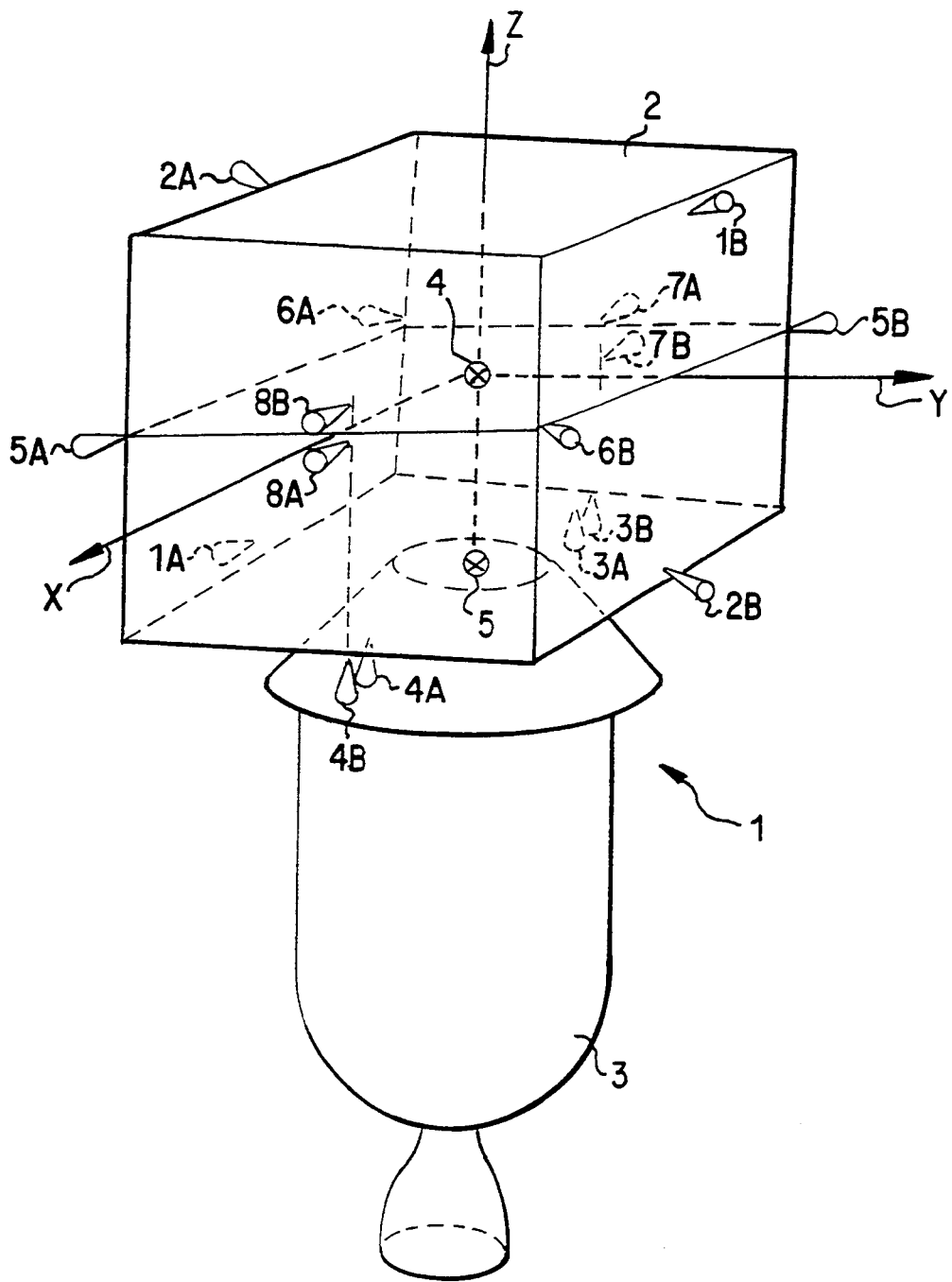
FIG. 1 is a schematic view of a satellite with an orthogonal body axis system, fuel nozzles provided as actuators, as well as a docked perigee power unit.

FIG. 1 illustrates a spacecraft 1 which is composed of a three-axis stabilized satellite 2 as well as a perigee power unit 3 which is docked to the satellite 2. A body coordinate system X, Y, Z is assigned to the satellite 2. The origin of the coordinate system is in the center of gravity 4 of the satellite 2. In contrast, the center of gravity 5 of the entire spacecraft 1 is shifted in the direction of the negative Z-axis. In the illustrated constellation, the Z-axis, which normally functions as the yaw axis of the satellite 2, forms the axis of symmetry for the whole spacecraft 1 and, at the same time, the axis of rotation about which the spacecraft 1 is to be rotated before the start of the perigee maneuver. This axis of symmetry coincides with the thrust direction of the perigee power unit 3. In the normal operation, the X-axis forms the roll axis, and the Y-axis forms the pitch axis of the satellite 2.

The satellite 2 carries a number of fuel nozzles which function as actuators and which, in their arrangement and direction of action, are adapted to the normal operation. The directions of action of the nozzle pairs 5a and 5B as well as 6A and 6B are situated in the XY-plane and are normally sloped at an angle with respect to the direction of the Y-axis. This is in order to avoid having the emerging gases aim at the solar generators that are arranged in the Y-axis direction, but are not shown separately in FIG. 1. In the normal operation, the nozzle pairs furnish controlling torques about the positive Z-axis (5A, 5B) as well as about the negative Z-axis (6A, 6B), thus providing yawing moments. In the shown constellation, controlling torques about the negative X-axis (5A, 6A) as well as about the positive X-axis (5B, 6B) are also added.

The directions of action of the nozzle pairs 1A and 1B as well as 2A and 2B are situated in the YZ-plane and are also sloped at an angle with respect to the direction of the Y-axis. During the normal operation, they furnish controlling torques about the positive X-axis (1A, 1B) as well as about the negative X-axis (2A, 2B), thus, the rolling moments. In the illustrated constellation, mainly nozzles 1B and 2A are operative because their directions of action run relatively far past the center of gravity 5 of the spacecraft, while the directions of action of nozzles 1A and 2B run past the center of gravity 5 at only a relatively short distance. Nozzles 1B as well as 2A therefore generate noticeable controlling torques about the positive and negative X-axis.

Nozzle pairs 3A and 3B as well as 4A and 4B are situated with their direction of action in the XZ-plane and in parallel to the positive Z-axis. In the normal operation, these result in controlling torques about the positive Y-axis (3A, 3b) as well as the negative Y-axis (4A, 4B), thus, resulting in pitching moments. In the illustrated constellation, these nozzles may also generate controlling torques about the Y-axis. Finally, nozzle pairs 8A and 8B as well as 7A and 7B are also shown. These nozzle's directions of action are situated in the XZ-plane and are oriented in parallel to the X-axis. In the normal operation, these nozzles are used mainly for the orbit control. This is because they can cause accelerations in the direction of the positive and the negative X-axis, thus causing increases and decreases of velocity in the orbiting direction. In the illustrated constellation, operating these nozzles results in controlling torques about the negative and positive Y-axis.

For the spin-up which occurs operation before the start of the perigee maneuver, 5A and/or 5B, or 6A and/or 6B, are used as actuators. During the spin-up phase, these nozzles continuously furnish desired controlling torques of a constant amount about the Z-axis. But, when only one of the two redundant propulsion systems (A or B) is used, these nozzles generate at the same time the above-mentioned high environmental torques about the lateral axes of the illustrated configuration.

Figure 2:
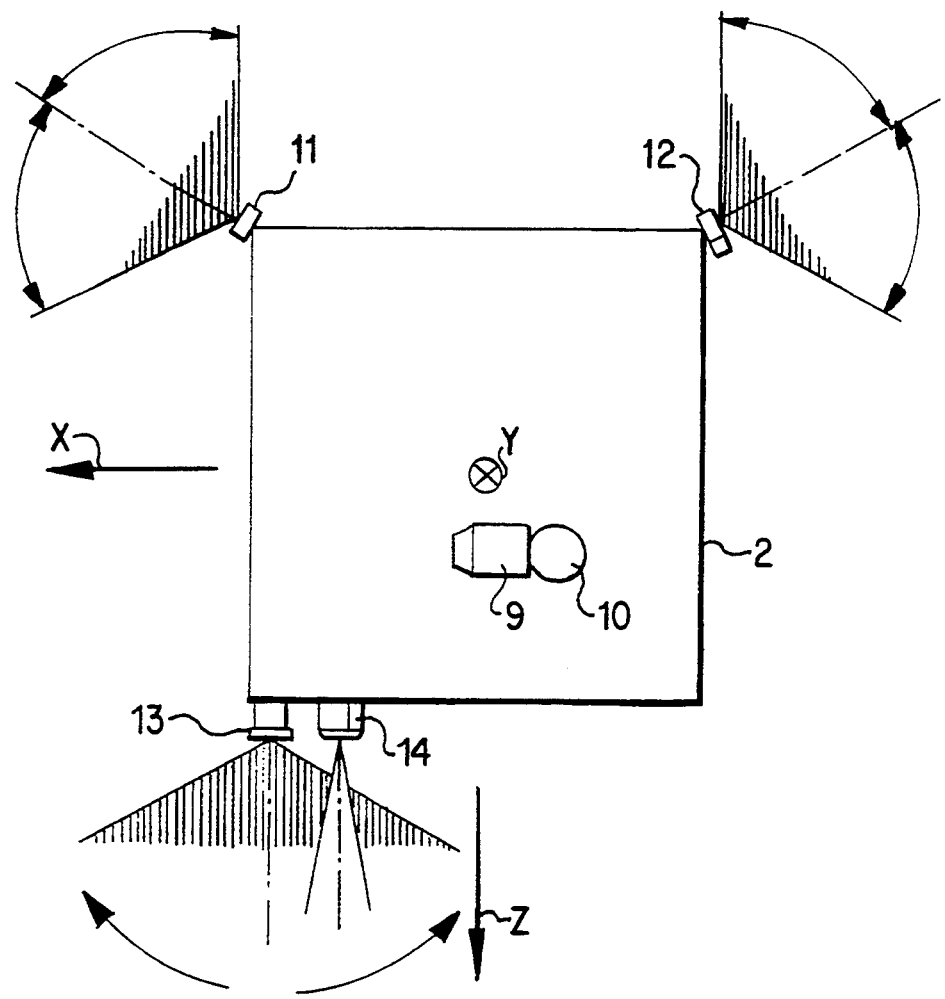
FIG. 2 is a schematic view of sun sensors and gyroscopes arranged on the satellite for angular velocity measuring.

FIG. 2 illustrates only the satellite 2 with its body axis system X, Y, Z as well as with different sensors which are used for determining the angular velocities about these axes. Thus, two gyroscopes 9 and 10 are provided for the formation of angular velocity signals $\omega_X$ as well as $\omega_Y$ with respect to rotations about the X-axis and the Y-axis. For determining the angular velocity about the Z-axis, sun sensors 11, 12 and 13 are provided. These sun sensors, with respect to their optical axes, have fields of view of ±60° respectively in two planes which are oriented perpendicularly with respect to one another and of which one is the XZ-plane. In the XZ-plane, the whole field of view of 360° is therefore directly covered. Although at first, perpendicularly in this respect, a double cone which is centered about the direction of the Y-axis and has an opening angle of 60° respectively is not detected, this will no longer be true when the satellite 2 or the spacecraft 1 rotates about the Z-axis during the spin-up operation. Then, irrespective of its relative position, the sun is detected once in every case during an orbit. By means of the sun sensors 11, 12 and 13, it is therefore possible to make available angular velocity signals $\omega_Z$ with respect to the rotation about the Z-axis, i.e., the axis of rotation.

Figure 3:
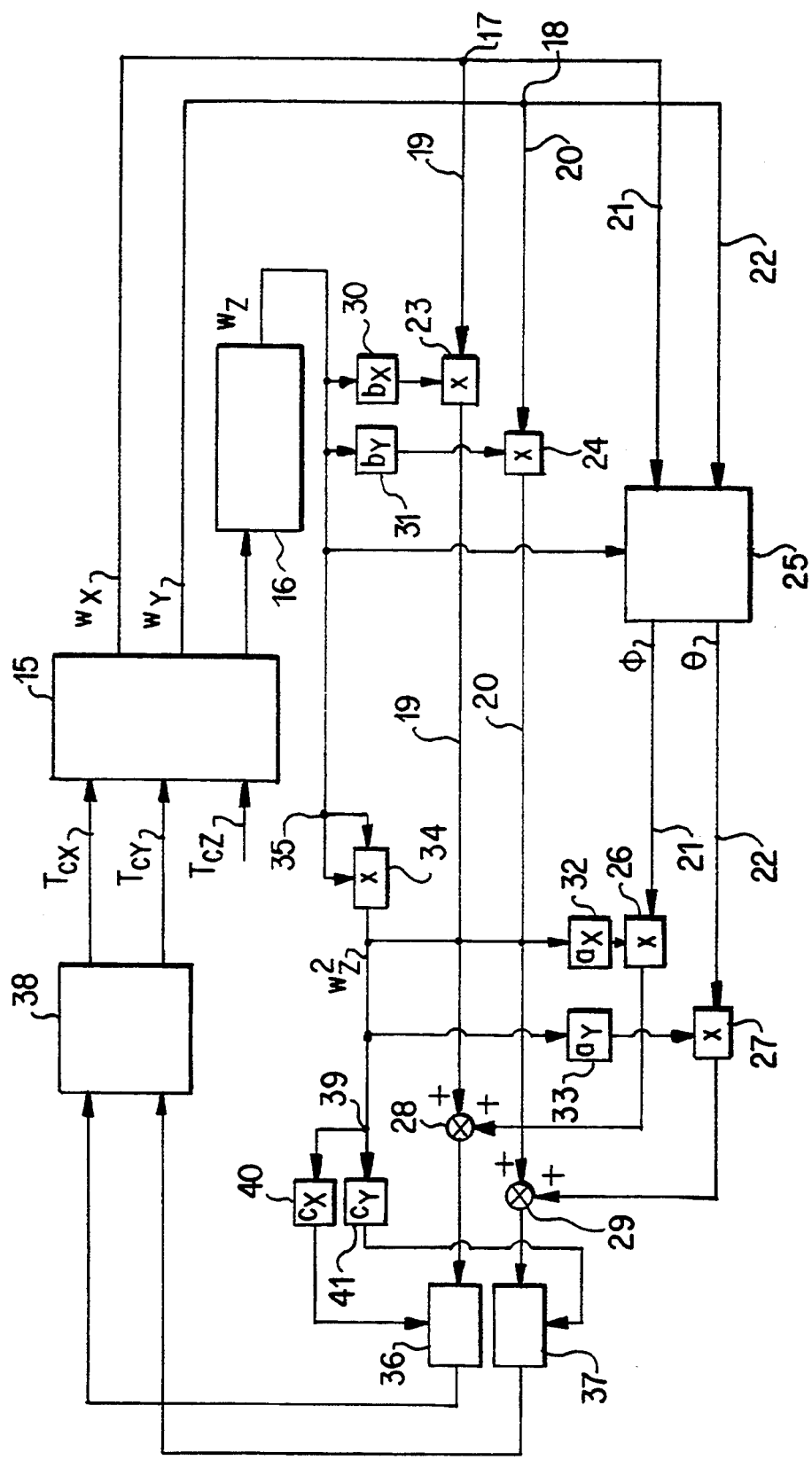
FIG. 3 is a block diagram of an attitude control device according to the invention.

FIG. 3 is a block diagram of an attitude control device according to the present invention. The spacecraft dynamics are represented by block 15. By means of corresponding measurements, lateral-axis angular velocity signals $\omega_X$ as well as $\omega_Y$ are provided with respect to vibrations about the X-axis and the Y-axis, as well as a rotation axis angular velocity signal $\omega_Z$ with respect to the rotation about the Z-axis which acts as the axis of rotation during the spin-up phase. As a function of how the rotation about the Z-axis takes place in a measuring manner, a device 16 for estimating the corresponding angular velocity may be required. The lateral-axis angular velocity signals $\omega_X$ and $\omega_Y$ couple with branching points 17 and 18 to first signal paths 19 and 20 as well as second signal paths 21 and 22. In the first signal paths 19 and 20, the lateral-axis velocity signals $\omega_X$ and $\omega_Y$ are fed to multiplication elements 23 and 24, where they are multiplied by factors which are proportional to the rotation axis angular velocity signal $\omega_Z$. For this purpose, the rotation axis angular velocity signal $\omega_Z$ is fed into two parallel amplifiers 30 and 31, into which proportional action constants $b_X$ and $b_Y$ are mixed which will be described in detail. The thus formed factors are fed to the multiplication elements 23 and 24.

In the second signal paths 21 and 22, the lateral-axis angular velocity signals $\omega_X$ and $\omega_Y$ are first fed to a common integrator 25. There, in a manner described below, angular position signals $\Phi$ as well as $\theta$ are obtained which are fed from the outputs of the integrator 25 to multiplication elements 26 and 27. The rotation axis angular velocity signal $\omega_Z$ is also fed into the integrator 25. In addition, this signal arrives via branch 35 formed at two inputs of another multiplication element 34. The output of element 34 provides a signal $\omega_Z^2$ which corresponds to the square of the rotation axis velocity signal. Signal $\omega_Z^2$ is fed to two amplification elements 32 and 33, where proportional action factors $a_X$ and $a_Y$ are mixed in. The thus formed signals are finally supplied to the two multiplication elements 26 and 27. Their output signals reach one group of inputs of two summation elements 28 and 29, whose other two inputs are connected with the outputs of the multiplication elements 23 and 24.

As a result of the branching 17, the multiplication elements 23 and 26, the summation element 28, proportionally the integrator 25, as well as the connecting lines, there is provided a first regulator network which, as it were, is assigned to the X-axis. A second regulator network is formed as a result of the branching point 18, the multiplication elements 24 and 27, the summation element 29, proportionally the integrator 25, as well as the connecting lines and, as it were, is assigned to the Y-axis.

The summation signals formed in the summation elements 28 and 29 are fed to two modulators 36 and 37 which are each equipped with dead zones and which furthermore are of a hysteresis character. They are used for supplying discrete actuating signals of a variable width and repetition rate as well as of a constant height by means of which the actuators are to be controlled. The actuators are symbolized by block 38 and generate controlling torques $T_{cX}$ as well as $T_{cY}$ about the X-axis and Y-axis. These, in turn, affect the satellite dynamics 15.

The positive and negative thresholds of the dead zones assigned to the modulators 36 and 37 may be varied in a continuous manner, specifically proportionally to the square $\omega_Z$ of the rotation axis angular velocity signal $\omega_Z^2$. For this purpose, the output signal of the multiplication element 34 is fed via a branching point 39 to two amplification elements 40 and 41 in which proportional action constants $c_X$ as well as $c_Y$ are mixed-in. The signals which are therefore proportional to $\omega_Z^2$ are fed to the modulators 36 and 37 or to the dead zones assigned to the modulators, for varying their thresholds. When modulators with fixed response thresholds are used, as an alternative, additional dead zone elements may be connected in front of the modulators. The modulators response thresholds can then be varied according to the rules of the invention.

The proportional action factors $b_X$ and $b_Y$ used in the case of the multiplications in the multiplication elements 23 and 24 may be determined, for example, on the basis of the following formulas:

$$b_X = \frac{\eta \cdot d}{\sqrt{1 - d^2}} \cdot \frac{I_X}{T_{CX}}$$

$$b_Y = \frac{\eta \cdot d}{\sqrt{1 - d^2}} \cdot \frac{I_Y}{T_{CY}}$$

$$\eta = \sqrt{\frac{|I_X - I_Z| \cdot |I_Y - I_Z|}{I_X I_Y}}$$

wherein $I_X$ as well as $I_Y$ are the two moments of inertia of the lateral axes; $I_Z$ is the moment of inertia of the axis of rotation; $T_{CX}$ is the controlling torque about the X-axis; and $T_{cy}$ is the controlling torque about the Y-axis. Parameter d is a damping factor to be selected in the range of $1 \geq d \geq 0.2$, preferably $d = 0.7$.

The proportional action factors $a_X$ and $a_Y$ as well as $c_X$ and $c_Y$ may be determined by means of the following formulas:

$$a_X = b_X \frac{\beta_{Nmax}}{\Phi_{max}}, \quad c_X = b_X \beta_{Nmax} T_{CX}$$

$$a_Y = b_Y \frac{\beta_{Nmax}}{\theta_{max}}, \quad c_Y = b_Y \beta_{Nmax} T_{CY}$$

wherein $\beta_{N\ max}$ is the highest permissible nutation amplitude, and $\Phi_{max}$, $\theta_{max}$ are the maximal amplitudes of the angular movement about the lateral vehicle axes (X-axis, Y-axis). According to past experience, numerical values in the following ranges are suitable:

$$0{,}1 \leq \left( \frac{\beta_{Nmax}}{\Phi_{max}}\ ;\ \frac{\beta_{Nmax}}{\theta_{max}} \right) \leq 1$$

$$0{,}25° \leq (\Phi_{max};\ \theta_{max}) \leq 1°$$

Angular position signals $\Phi$ and $\theta$ are formed in the integrator 25 from the lateral-axis angular velocity signals $\omega_X$ and $\omega_Y$ fed on the input side, specifically by the integration of the following equation system:

$$\dot{\Phi} = \omega_X + \theta\omega_Z$$

$$\dot{\theta} = \omega_Y - \Phi\omega_Z$$

These equations are obtained from the known kinematic Euler's equations for three axes, provided that the rotations about the Eulerian angles $\Psi$, $\theta$, and $\Phi$ in this sequence first take place about the Z-axis, then about the Y-axis and finally about the X-axis. It is another prerequisite that the Eulerian angles $\Phi$ and $\theta$ about the lateral axes are small; the corresponding cosine values therefore become 1; and the corresponding sine values can be equated to the angle. The above-mentioned equation system represents an expedient simplification, in the case of which the integration still must only be carried out for two axes.

Figure 4:
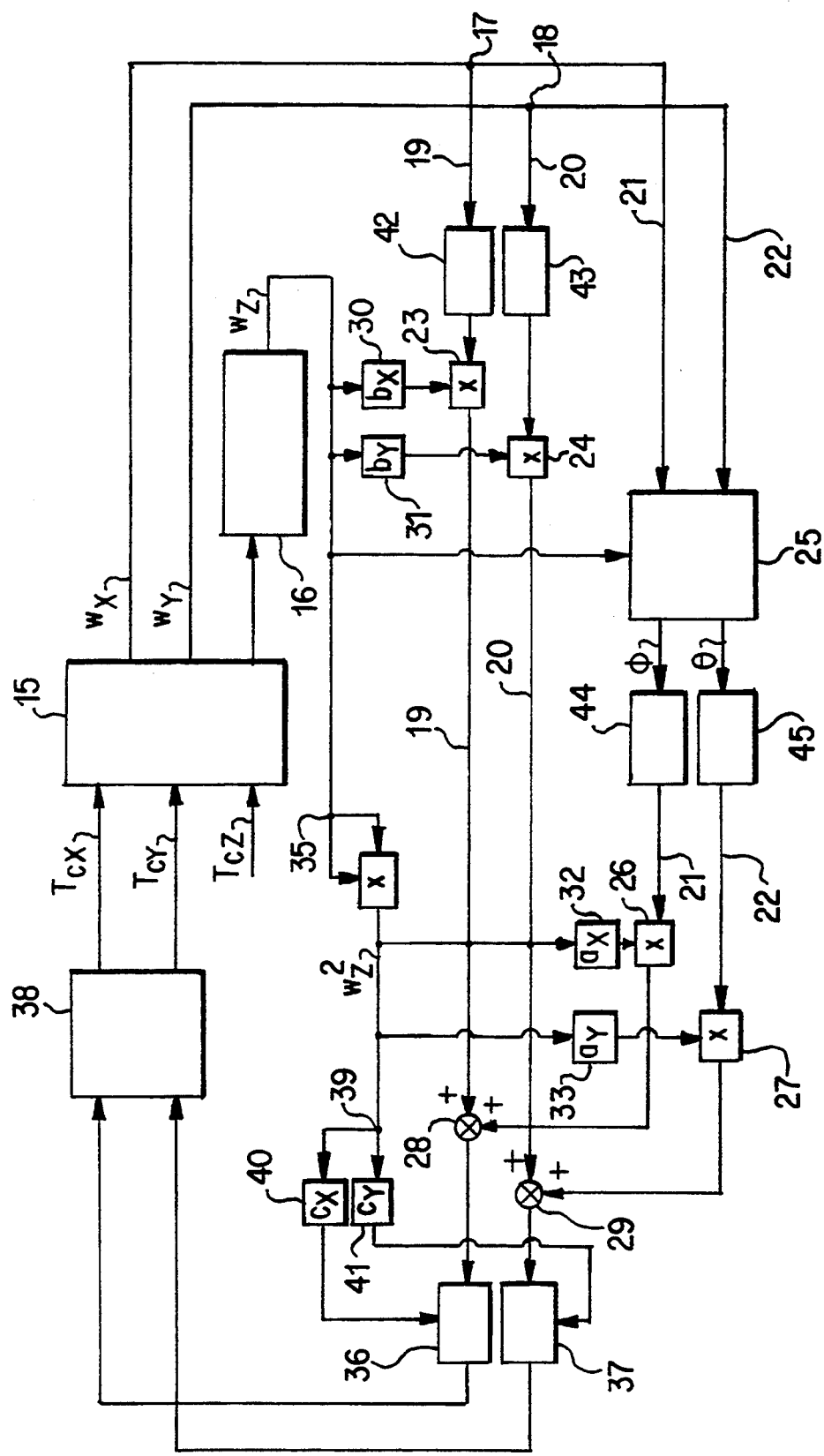
FIG. 4 is a block diagram of a modified attitude control device according to the invention.

FIG. 4 shows a schematic block diagram of a modified attitude control device according to the invention which is similar in important aspects to the block diagram of FIG. 3. The only difference is that filters 42 and 43, as well as 44 and 45, are inserted in the first and second signal paths 19, 20 and 21, 22 in front of the respective multiplication elements 23, 24 and 26, 27. The transmission function of these filters in the numerator should be at least of the first degree, but preferably of the second degree. It is self-evident that the denominator degree is at least as high as the numerator degree. Accordingly, for example, transmission functions of the following form may be used:

$$\frac{Ts}{1 + Ts}\ ;\ \frac{T^2 s^2}{(1 + Ts)^2}$$

Numerator degrees of a higher order than the first order are particularly useful when the increase of the rate of rotation $\dot{\omega}_Z = T_{CZ}/I_Z$ is fast because of a high spin-up torque ($T_{cz}$) or a relatively low moment of inertia ($I_Z$). This is because then constant signal fractions which cannot be neglected will still remain at the output of the filters 42 to 45.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An attitude control device for a spacecraft rotatable about an axis of rotation, comprising actuators for generating torques about said axis of rotation and two lateral axes orthogonal to each other and said axis of rotation;

sensors for forming angular velocity signals ($\omega_X$, $\omega_Y$, $\omega_Z$) with respect to the axes;

two modulators having variable dead zones, each one of said two modulators being coupled in front of said actuators assigned to one of said two lateral axes, said two modulators emitting control signals to said actuators;

two regulator networks, each one of said two regulator networks receiving an angular velocity signal for one of said lateral axes, each one of said two regulator networks furnishing a control signal for one of said two modulators, said two regulator networks having first and second paths connected in parallel, each path including two signal paths;

an integrator coupled in said second signal path;

two first multiplication elements, one of said two first multiplication elements being connected in each of said two first signal paths, said two first multiplication elements using multiplication factors proportionally dimensioned ($b_X$, $b_Y$) to an angular velocity signal ($\omega_Z$) of said axis of rotation;

two second multiplication elements, one of said two second multiplication elements being connected in each of said two second signal paths following said integrator, said two second multiplication elements using multiplication factors proportionally dimensioned ($a_X$, $a_Y$) to a square ($\omega_Z^2$) of the angular velocity signal ($\omega_Z$) of said axis of rotation; and devices for varying the dead zone of each of said two modulators proportionally ($c_X$, $c_Y$) to the square ($\omega_Z^2$) of the angular velocity signal of said axis of rotation.

2. A device according to claim 1, further comprising a filter connected into each of the two first and second signal paths, each of said filters receiving a lateral-axis angular velocity signal ($\omega_X$, $\omega_Y$), said filters having a transmission function in a numerator at least of the first degree.

3. A device according to claim 1, wherein the integrator in the second path is a combined integrator in which two angular position signals $\Phi$ and $\theta$ are formed as output signals by the integration of the following equations:

$$\dot{\Phi} = \omega_X + \theta\omega_Z$$

$$\dot{\theta} = \omega_Y - \Phi\omega_Z$$

wherein $\omega_X$ and $\omega_Y$ are the two lateral-axis angular velocity signals; $\omega_Z$ is the rotation axis angular velocity signal; and $\dot{\Phi}$ and $\dot{\theta}$ are time derivations of the angular position signals determined by the integration.

4. A device according to claim 2, wherein the integrator in the second path is a combined integrator in which two angular position signals $\Phi$ and $\theta$ are formed as output signals by the integration of the following equations:

$$\dot{\Phi} = \omega_X + \theta\omega_Z$$

$$\dot{\theta} = \omega_Y - \Phi\omega_Z$$

wherein $\omega_X$ and $\omega_Y$ are the two lateral-axis angular velocity signals; $\omega_Z$ is the rotation axis angular velocity signal; and $\dot{\Phi}$ and $\dot{\theta}$ are time derivations of the angular position signals determined by the integration.

5. A device according to claim 2, wherein said transmission function has a numerator of the second degree.

6. An attitude control process for a spacecraft to be rotated about a body's axis of rotation, said spacecraft being equipped with actuators for generating controlling torques about the axis of rotation as well as about two lateral axes orthogonal to the axis of rotation and to one another, sensors for forming angular velocity signals ($\omega_X$, $\omega_Y$, $\omega_Z$,) with respect to the three axes, and modulators, each provided with a variable dead zone, for emitting control signals for the actuators assigned to the lateral axes (X, Y), a first signal fraction being formed in a first signal path from each of the two lateral-axis angular velocity signals ($\omega_X$, $\omega_Y$); and a second signal fraction being formed in a second signal path, said second signal path being connected in parallel to the first signal path and containing an integrator, a second signal fraction being a sum of the two signal fractions being fed to the respective modulator as a control signal, wherein the process comprises the steps of:

in the two first signal paths, performing one multiplication using a factor which is proportional ($b_X$, $b_Y$) to the rotation axis angular velocity signal ($\omega_Z$);

in the two second signal paths, performing one multiplication, following the integrator, using a factor ($a_X$, $a_Y$) which is proportional to the square of the rotation axis angular velocity signal ($\omega_Z^2$) and;

varying the thresholds of the dead zones proportionally ($c_X$, $c_Y$) to the square of the rotation axis velocity signal ($\omega_Z^2$).

7. A process according to claim 6, wherein in the case of a geostationary satellite, the process further comprises the step of obtaining the rotation axis angular velocity signal ($\omega_Z$) by an estimation from measurements of sun sensors.

8. A process according to claim 6, wherein the lateral-axis angular velocity signals ($\omega_X$, $w_Z$), before being fed into the first and second signal paths, are subject to filtering in a filter whose transmission function in the numerator is at least of the first degree.

9. A process according to claim 7, wherein the lateral-axis angular velocity signals ($\omega_X$, $\omega_Z$), before being fed into the first and second signal paths, are subject to filtering in a filter whose transmission function in the numerator is at least of the first degree.

10. A process according to claim 6, wherein in the first and second signal paths, before the multiplication, a filtering takes place in a filter whose transmission function in the numerator is at least of the first degree.

11. A process according to claim 7, wherein in the first and second signal paths, before the multiplication, a filtering takes place in a filter whose transmission function in the numerator is at least of the first degree.

12. A process according to claim 6, wherein the integrations to be carried out in the integrator of the two second signal paths are linked with one another via the following equations to be integrated:

$$\dot{\Phi} = \omega_X + \Theta \omega_Z$$

$$\dot{\Theta} = \omega_Y - \Phi \omega_Z$$

13. A process according to claim 6, wherein the proportional action constants $b_X$, $b_Y$ in the factors of the multiplications taking place in the two first signal branches have the following form:

$$b_X = \frac{\eta \cdot d}{\sqrt{1 - d^2}} \cdot \frac{I_X}{T_{CX}}$$

$$b_Y = \frac{\eta \cdot d}{\sqrt{1 - d^2}} \cdot \frac{I_Y}{T_{CY}}$$

$$\eta = \sqrt{\frac{|I_X - I_Z| \cdot |I_Y - I_Z|}{I_X I_Y}}$$

wherein $I_X$, $I_Y$ are the two moments of inertia of the lateral axes; $I_Z$ is the moment of inertia of the axis of rotation; $T_{CX}$ is the controlling torque about the X-axis of the vehicle; $T_{CY}$ is the controlling torque about the Y-axis of the vehicle, and d is a damping factor to be selected in the range of $1 \geq d \geq 0.1$.

14. A process according to claim 6, wherein the proportional action constants $a_X$, $a_Y$ in the factors of the multiplications to be carried out in the two second signal paths have the following form:

$$a_X = \frac{\eta \cdot d}{\sqrt{1 - d^2}} \cdot \frac{I_X}{T_{CX}} \cdot \frac{\beta_{Nmax}}{\Phi_{max}}$$

$$a_Y = \frac{\eta \cdot d}{\sqrt{1 - d^2}} \cdot \frac{I_Y}{T_{CY}} \cdot \frac{\beta_{Nmax}}{\theta_{max}}$$

wherein $\beta_{N\,max}$ is the highest permissible nutation amplitude, and $\Phi_{max}$, $\theta_{max}$ are the maximal amplitudes of the angular movement about the lateral axes.

15. A process according to claim 6, wherein the proportional action constants having an effect during the variation of the thresholds of the dead zones have the following form:

$$c_X = \frac{\eta \cdot d}{\sqrt{1 - d^2}} \cdot I_X \cdot \beta_{Nmax}$$

$$c_Y = \frac{\eta \cdot d}{\sqrt{1 - d^2}} \cdot I_Y \cdot \beta_{Nmax}.$$

* * * * *